United States Patent [19]
Nemeth

[11] 3,853,538
[45] Dec. 10, 1974

[54] USE OF REDUCING GAS BY COAL GASIFICATION FOR DIRECT IRON ORE REDUCTION

[75] Inventor: Edward J. Nemeth, Mount Lebanon Township, Allegheny County, Pa.

[73] Assignee: United States Steel Corporation, Pittsburgh, Pa.

[22] Filed: July 20, 1973

[21] Appl. No.: 381,103

[52] U.S. Cl. .................................................. 75/35
[51] Int. Cl. .......................................... C21b 13/00
[58] Field of Search ................................ 75/34, 35

[56] References Cited
UNITED STATES PATENTS

| | | | |
|---|---|---|---|
| 1,256,623 | 2/1918 | Westberg et al. | 75/34 |
| 2,740,706 | 4/1956 | Paull et al. | 75/35 |
| 2,755,179 | 7/1956 | Stalhed | 75/35 |
| 3,562,780 | 2/1971 | Eisenberg | 75/34 |

Primary Examiner—L. Dewayne Rutledge
Assistant Examiner—M. J. Andrews
Attorney, Agent, or Firm—William L. Krayer

[57] ABSTRACT

A method employing reducing gas in an ore reducing furnace, which reducing gas is obtained from the gasification of coal is disclosed in which part of the unused reducing components from the reducing furnace is recirculated, and its $CO_2$ content reduced, and in which the composition of the original gas coming from the coal gasification process is enriched while mixing it with the recycled gas. A portion of the recycled gas containing a very small concentration of oxidizing components can be introduced into the gasifier to control the gasification temperature, or all or a portion may be introduced at a point intermediate between the gasifier and desulphurizer to bring the gas to a suitable temperature for desulphurization, or a portion can be introduced to a cooling zone in the shaft furnace to cool the reduced ore; in all cases, the recycled gas enriches the coal gas and helps to bring it to a suitable temperature for ore reduction.

7 Claims, 1 Drawing Figure

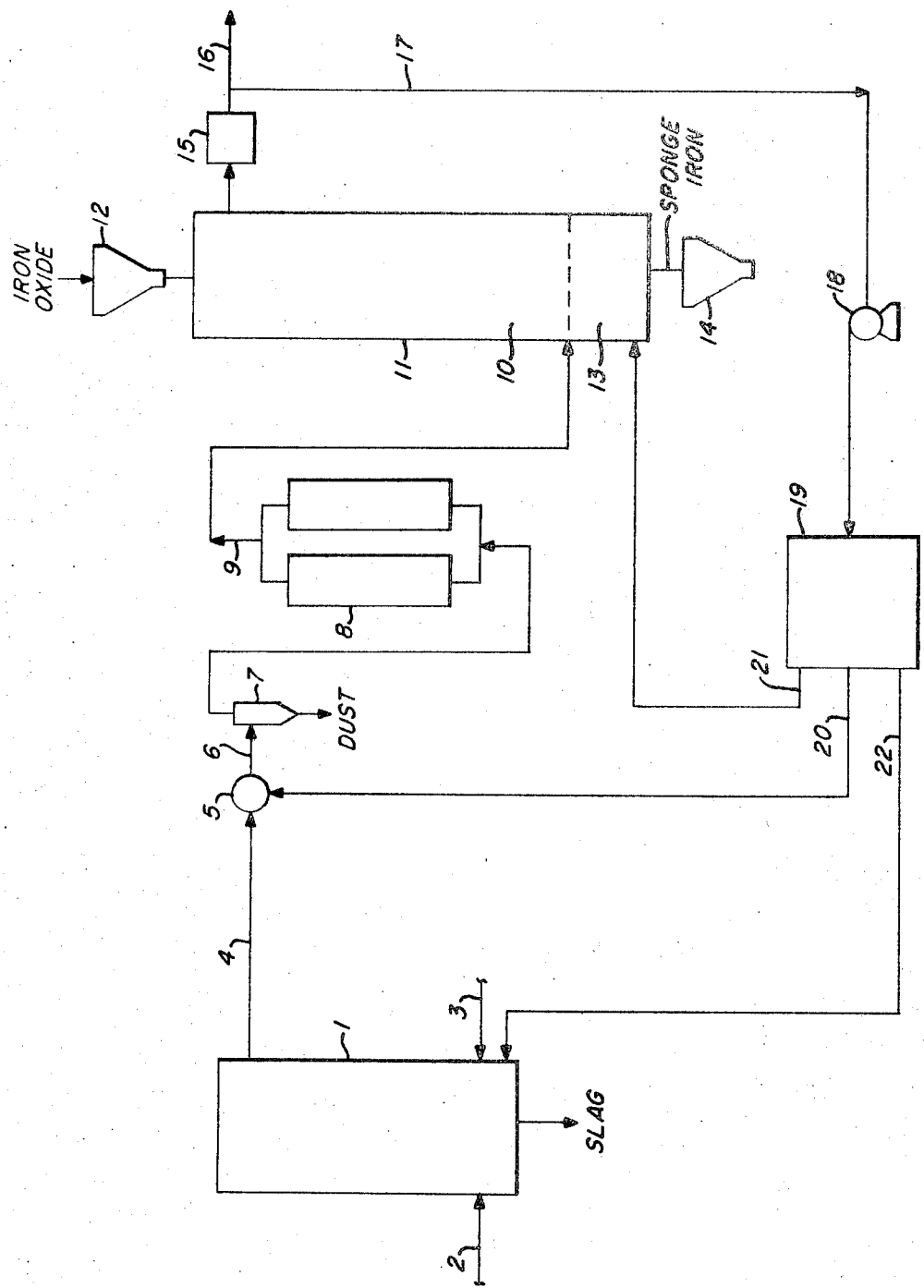

3,853,538

USE OF REDUCING GAS BY COAL GASIFICATION FOR DIRECT IRON ORE REDUCTION

BACKGROUND OF THE INVENTION

Prior to the present invention, it was known generally to convey gas containing relatively large portions of hydrogen and carbon monoxide into an ore reducing furnace where it is used to reduce the ore to a relatively high iron content composition. Generally, the hydrogen and carbon monoxide are derived from natural gas, but a few processes have been proposed which would convert coal to CO and $H_2$. Various modifications of the coal-based process have been proposed through the years. However, most of the systems suffered from one or more of the following deficiencies.

The carbon monoxide and hydrogen are produced at relatively low concentration insufficient for effective use in a reducing furnace and the process commonly known as direct reduction. Because of the relatively low concentration of reducing gases, means have been provided to remove the relatively high concentration of water vapor and carbon dioxide so that the portions of reducing gases are higher. Such water vapor and carbon dioxide removing processes require that the gas mixture be at nearly ambient temperature. Removal of the sulfur compounds in the reducing gas is also routinely accomplished at the reduced temperature. Accordingly, with reheating of the gas for use in the reducing furnace, the heat efficiency of such a process is very poor.

Because of the nature of the gas made by coal gasification, carbon formation can occur during the reheating of the gas by the decomposition of the carbon monoxide into carbon and carbon dioxide or by the reaction of CO and $H_2$. Carbon formation is undesirable in the following respects:

a. It fouls the heat transfer surfaces, thereby slowing down the transfer of heat.
b. It shortens the life of the heat transfer surfaces because of carburization of the metal, and
c. It adds an oxidizing component to the gas, thus detracting from its ore reduction potential.

Therefore, a catalytic shift conversion step is necessary to convert the reducing components to mostly hydrogen so as to avoid carbon deposition. This is a cumbersome, expensive step.

Some of the coal gasification techniques make gases which are not hot enough for use in the ore reduction furnace. These gases must then also undergo heating to bring them to the desired temperature. Therefore, catalytic shift conversion of these gases is also necessary.

Many of the processes proposed require special fuels usually either a liquid hydrocarbon fuel or a noncaking-type coal. Therefore, the processes are limited by the availability of liquid fuels or the special types of coal.

Many of the prior art processes produce relatively high concentrations of gases such as methane, ethane, and ammonia, along with the reducing gases. Such gases do not participate in the reducing function; they dilute the reducing gas as well as tie up valuable carbon and hydrogen which might be used for ore reduction.

Because of the nature of many coal gasifiers, condensable liquids are often produced. These must be removed prior to reheating the gases to avoid fouling various process members. This in turn leads to severe waste water treatment problems.

Some of the systems, while incorporating a means to desulfurize the hot gas before passing it through the reduction furnace, expel the sulfur by roasting the sulfur-containing acceptor in the preheat section of the reducer which leads to serious air pollution problems.

Previous attempts by workers in the art to overcome the above problems, and which are relevant to my invention include the disclosure of Jensen in U.S. Pat. No. 2,865,732. However, Jensen does not send any recycle gas to a coal gasifier nor does Jensen remove $CO_2$ from the recycle stream until it is mixed with fresh gas from the gasifier. As will be revealed in my description, my invention avoids the repeated cooling or condensation step and alternate heating used by Jensen, which are conducive to the formation of carbon deposits.

The reader may also be interested in Paull, U.S. Pat. Nos. 2,740,706, Brassert 2,547,685, Happel 3,615,351, and Cavanaugh, of which employ recycle gas under conditions different from mine, in U.S. Pat. Nos. O'Day 3,032,410, Halley 3,151,973, Bradley 2,068,842, Gornowski 2,633,416, Stalhed 2,753,179, Heingelmann 3,475,160, and Hatarescu 3,607,225.

SUMMARY OF THE INVENTION

I have invented a process which overcomes the above disadvantages and makes it possible to produce a reduced iron ore of from 90 to 95 percent iron content, and at the same time converts any solid fossil fuel, i.e., coal, including lignite, subbituminous, or other low-grade coals, as well as char products from coal conversion processes, into a highly useful reducing gas.

Referring now to FIG. 1, which is a diagrammatic illustration of a preferred system, the gasifier 1 is provided with inlets 2 for pulverized coal or other fossil fuel and 3 for oxygen and optionally a small quantity of steam; an outlet 4 leading to the mixing point 5 for the introduction of recycled gas through line 20. A line 6 from the mixing point 5 leads to the dust separators 7 which may be a cyclone or any other convenient device, and then to the desulfurizer 8, having an optional alternate unit and an exit line 9 leading to the bottom of the reducing zone 10 of shaft furnace 11 which has at its top a hopper input 12 for iron ore, and a cooling zone 13. Below the cooling zone 13 is an exit for reduced iron ore 14. Near the point of exit of the gases from the furnace is a scrubber 15 for gases emerging from the furnace, and the fuel gas 16 is withdrawn and the remaining gases pass through a recycle line 17 leading to compressor 18. A carbon dioxide removal unit 19 which may be any conventional carbon dioxide removal unit follows the compressor 18. The recycle gas proceeds through either one, two, or all the lines 20, 21, and 22, respectively, to the mixing point and/or to the cooling zone of the reducing furnace and/or to the gasifier.

In my system, I conduct the coal gasification in a conventional entrainment gasifier at a temperature of over 2,000° F, preferably in a range of from 2,200° to 4,000° F. The gas emerging from the gasifier comprises generally 80 to 90 percent reducing gases, (carbon monoxide about 60 percent and hydrogen about 25 percent about 5 to 20 percent oxidizing gases, (carbon dioxide about 5 percent and water vapor about 7 percent) and the balance (up to about 4 percent) mostly nitrogen and hydrogen sulfide. I operate this gasifier under conditions which involve little or no steam introduction into the gasifier, and the introduction of only enough oxygen to supply sufficient heat for the gasification and to convert most of the carbon of the coal to carbon monoxide, and not so much as to convert large quantities of carbon to carbon dioxide or coal hydrogen to water vapor. This gasification procedure is ideally suited for manufacture of gases for direct reduction because it makes a hot gas rich in reducing components, and by virtue of the high reaction temperature in the gasifier, utilizes all or nearly all of the carbon in the fuel, allows the use of any type of coal, and generates little or no other hydrocarbon or nitrogen products. The gasifier can be operated at any convenient pressure, but generally at 25 to 100 psig. It generates a molten slag from the ungasified fuel and ash.

The gas mixture emerges from the gasifier at a temperature typically of about 2,700° F, but generally in the range of 2,200° to 3,000° F. The coal gas is mixed with recirculating gas to increase the percentage of reducing components in the gas, to conserve the valuable gases, and to bring the reducing gas to a temperature suitable for direct reduction and desulfurization. After introduction of the recycled gas into the stream, in volumes approximately equal to those of the original coal gas, the stream is placed into a desulfurizer containing calcined dolomite or limestone and from there is passed into the reducing zone of the shaft furnace. After passing through the reducing zone of the shaft furnace, which typically contains iron ore in pellet form, although lump ore may also be used, the gas is passed through a scrubber where dust and some water vapor are removed. A portion of the gas, typically 20 to 30 percent, is bled off at this point and becomes a useful, desulfurized fuel. The remainder is then recirculated through a compressor to a carbon dioxide removal unit and then mixed with the original coal gas.

Several alternative points are available for mixing the recirculated gas with the gas made in the gasifier. For instance, all the recirculated gas can be introduced at a point in the process between the gasifier and the desulfurizer, thus enriching the gas and bringing it to a temperature suitable for desulfurization and direct reduction, preferably between 1,200° to 2,000° F. Alternatively, a portion of the recirculated gas can be introduced into the gasifier to moderate the temperatures in the gasifier. A portion of the recirculated gas can also be diverted to a cooling zone of the shaft furnace to cool the reduced ore before discharge to the atmosphere. In this case, further cooling of the gas made in the gasifier might be necessary, but the overall heat economy of the process is improved. Because the gas leaving the desulfurization unit and entering the reducing zone of the shaft furnace contains a small amount of hydrogen sulfide, typically 50 to 200 ppm, the reduced ore descending through the cooling zone of the shaft is impregnated with sulfur to a level so slight as to not affect its quality. However, it is well known that the presence of sulfur retards the formation of carbon from reducing gases. Therefore, carbon formation in the portion of the recycle gas used for cooling the reduced ore is slight, and the reduced ore contains typically only 1 to 1.5 percent carbon, a level which enhances its qualities as an electric furnace feedstock, and the effect on reducing gas quality is slight.

The reducing gas made in the gasifier, preferably after passing through mechanical dust collectors, and blending with some portion of recirculated gas is at a temperature of about 1,200° to 2,000° F. It then passes through a bed of calcined dolomite or limestone where the calcium oxide is converted to calcium sulfide by reaction with the hydrogen sulfide of the gas. Two units, one operating on the reducing gas and the other undergoing regeneration, or a single gravitating bed, may be used. The desulfurizing agent is regenerated by subjecting the spent reagent to a stream containing approximately equal parts of steam and carbon dioxide, preferably at about 900° to 1,100°F and at about 10 atm or greater pressure. The off-gas from the regeneration is treated for the recovery of elemental sulfur, and the desulfurizing agent is calcined and used again.

Upon exiting from the desulfurizer, the gas enters reducing zone of the shaft furnace. If a portion of the recirculated gas has been used to cool the reduced ore, the bas blends with the gas used for cooling at this point.

Persons skilled in the art will observe that my process allows for the introduction to the ore reduction furnace of a hot reducing gas of over 90 percent reducing components which is necessary for efficient ore reduction. I have accomplished this while at the same time operating a process in which coal consumption is minimized because of the inherent conservation involved with the recycling of unused gaseous reducing components. Furthermore, by use of the recycled gas, I have been able to control the gas temperature at the appropriate level for ore reduction and for desulfurization. I have avoided throughout the necessity to cool and reheat the gas for either enrichment or desulfurization. Thus, carbon formation has been avoided and it is unnecessary to convert the gas to a more hydrogen-rich gas. Because of the benefit of the exothermic carbon monoxide-iron ore reaction as contrasted to the endothermic hydrogen-iron ore reaction, which leads to a more favorable temperature profile in the shaft furnace, the furnace operates more efficiently with my gas than one which contains high percentages of hydrogen. The system therefore benefits from a high degree of efficiency and minimizes the number of processing steps which the gasifier gas must undergo to make it suitable for ore reduction.

The recycle gas should be introduced to the mixing point ahead of the desulfurizer in quantities sufficient to reduce the temperature of the mixture to less than 2,000° F but preferably not less than 1,200° F, below which carbon deposition is enhanced. In the preferred mode of practice of my invention, the recycle gas is introduced to the cooling one of the shaft reducer at a rate of about 20,000 SCF/ton of sponge iron. All of the gas recycled should be sufficient, when combined with new gas generated in the gasifier, so that the combined stream contains at least 90 percent reducing gas, i.e., hydrogen and/or carbon monoxide.

The following example illustrates the speculation application of the process to the reduction of pelletized iron ore to sponge iron by the gasification of lignite, a low-grade fuel generally not suitable for metallurgical use.

Pulverized lignite of about 70 percent less than 200 mesh and dried to 4 percent moisture is used to prepare the reducing gas. The lignite has a dry basis heating value of 10,524 btu/lb and has the following composition on a dry basis.

| Component | Wt. Percent |
|---|---|
| Carbon | 59.7 |
| Hydrogen | 4.4 |
| Oxygen | 23.9 |
| Nitrogen | 0.9 |
| Sulfur | 0.8 |
| Ash | 10.3 |

This lignite is charged to the entrainment gasifier and 0.608 tons of unheated oxygen is injected for every ton of lignite. The gasifier operates at about 50 psig and the shell is protected by water cooling. For each ton of lignite, 52,300 scf of gas discharges from the gasifier at 2,700 F and at the following composition.

| Component | Mole Percent |
|---|---|
| Carbon Monoxide | 60.7 |
| Hydrogen | 25.5 |
| Carbon Dioxide | 5.1 |
| Water Vapor | 7.9 |
| Nitrogen | 0.5 |
| Hydrogen sulfide | 0.3 |

The water cooling in the vessel jacket allows the generation of 1,050 pounds of steam at 600 psig and 600° F for each ton of lignite, and 255 pounds of waste ash and unburned carbon leave the gasification zone in the form of slag. The gas is further cooled to about 2,500° F with the concomitant generation of 390 pounds steam at 600 psig and 600° F. This gas is then mixed with 22,300 scf/ton of lignite of recycle gas and the dust is removed in mechanical collectors and recirculated to the gasifier. The gas, then at about 1,780° F, is desulfurized in a fixed bed of calcined dolomite. It then enters the reducing zone of a shaft furnace where it is further mixed with 30,000 scf of recycle gas per ton lignite which gas has been used to cool the sponge iron. The reducing gas, then at about 1,700° F, has the following composition.

| Component | Mole Percent |
|---|---|
| Carbon Monoxide | 56.1 |
| Hydrogen | 34.1 |
| Carbon Dioxide | 2.8 |
| Water Vapor | 5.9 |
| Nitrogen | 1.1 |

In addition, this reducing gas contains about 135 ppm of hydrogen sulfide; this sulfur reacts with the descending reduced iron ore, and the slightly sulfur impregnated sponge iron retards carbon formation in the recycle gas used for cooling the sponge iron.

In passing through the shaft reducer, this hot gas converts about 2.3 tons of iron oxide pellets to about 1.5 tons of 95 weight percent reduced iron ore. The off-gas at 700° F is then scrubbed to remove any entrained ore dust and 28,200 scf/ton lignite of the gas at 100° F is drawn off for use as fuel. This gas has the following composition.

| Component | Mole Percent |
|---|---|
| Carbon Monoxide | 37.0 |
| Hydrogen | 30.6 |
| Carbon Dioxide | 25.0 |
| Water Vapor | 6.3 |
| Nitrogen | 1.1 |

The portion of gas not used for fuel is compressed to 300 psig and scrubbed with a potassium carbonate solution at 200° F for the purpose of removing carbon dioxide. For each ton of lignite gasified, 52,300 scf of recycle gas exit from the potassium carbonate scrubber, and it has the following composition:

| Component | Mole Percent |
|---|---|
| Carbon Monoxide | 51.5 |
| Hydrogen | 42.7 |
| Carbon Dioxide | 0.5 |
| Water Vapor | 3.7 |
| Nitrogen | 1.6 |

My process is not limited to the above particular illustrations and examples. It may be otherwise variously practiced within the scope of the following claims.

I claim:

1. Process for reducing iron ore comprising:
   a. gasifying solid fossil fuel at a temperature of at least 2,000° F to obtain a reducing gas containing at least about 80 percent hydrogen and carbon monoxide, and a molten slag,
   b. mixing said reducing gas with a $CO_2$-lean tail gas from a reducing furnace in a volume ratio of from 40:60 to 60:40 to reduce the temperature of the mixture to less than 2,000° F,
   c. removing sulfur compounds from the mixture thus obtained,
   d. passing the desulfurized mixture thus obtained into a reducing furnace for the reduction of iron oxide,
   e. removing $CO_2$ from at least a portion of the tail gas from said reducing furnace, and
   f. passing at least a portion of the $CO_2$-lean tail gas thus produced to be mixed with said reducing gas, prior to removing the sulfur therefrom.

2. Process of claim 1 in which the reducing gas — tail gas mixture is desulfurized by calcined dolomite or limestone.

3. Process of claim 1 in which a portion of the $CO_2$-lean recycle gas is passed to the cooling zone of the reducing furnace.

4. Process of claim 1 in which at least a portion of the $CO_2$-lean tail gas is mixed with the reducing gas in the solid fossil fuel gasifier.

5. Process of claim 1 in which the solid fossil fuel is coal.

6. Process of claim 1 in which over 90 percent of the gas delivered to the reducing furnace is reducing gas.

7. Process of claim 1 in which the mixture of reducing gas and recycled $CO_2$-lean tail gas has a temperature of at least 1,200°.

* * * * *